United States Patent
Yoshida

(10) Patent No.: US 8,797,410 B2
(45) Date of Patent: Aug. 5, 2014

(54) IMAGE PICKUP APPARATUS, IMAGE PICKUP SYSTEM, AND METHOD FOR DRIVING IMAGE PICKUP APPARATUS

(71) Applicant: Canon Kabushiki Kaisha, Tokyo (JP)

(72) Inventor: Daisuke Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/103,109

(22) Filed: Dec. 11, 2013

(65) Prior Publication Data

US 2014/0168449 A1    Jun. 19, 2014

(51) Int. Cl.
*H04N 17/00* (2006.01)
(52) U.S. Cl.
USPC .......................................................... 348/175
(58) Field of Classification Search
USPC ......... 348/175, 176, 552, 553, 725, 302, 308, 348/222.1
See application file for complete search history.

(56) References Cited

U.S. PATENT DOCUMENTS

| | | | | |
|---|---|---|---|---|
| 7,068,206 | B2 * | 6/2006 | Augusto et al. ................ | 341/172 |
| 8,169,498 | B2 * | 5/2012 | Yamashita .................. | 348/222.1 |
| 8,284,285 | B2 * | 10/2012 | Takahashi ..................... | 348/302 |
| 8,451,361 | B2 * | 5/2013 | Yamashita .................... | 348/308 |

FOREIGN PATENT DOCUMENTS

| | | |
|---|---|---|
| JP | 2011-114785 A | 6/2011 |
| JP | 2011-250039 A | 12/2011 |

* cited by examiner

*Primary Examiner* — Paulos M Natnael
(74) *Attorney, Agent, or Firm* — Canon USA, Inc. IP Division

(57) ABSTRACT

There are provided an image pickup apparatus, an image pickup system, and a method for driving the image pickup apparatus which perform correction of a reference potential used in an operation performed by a successive approximation AD conversion circuit and correction of a digital signal, into which a pixel signal which is output by a pixel is converted.

16 Claims, 7 Drawing Sheets

FIG. 6A
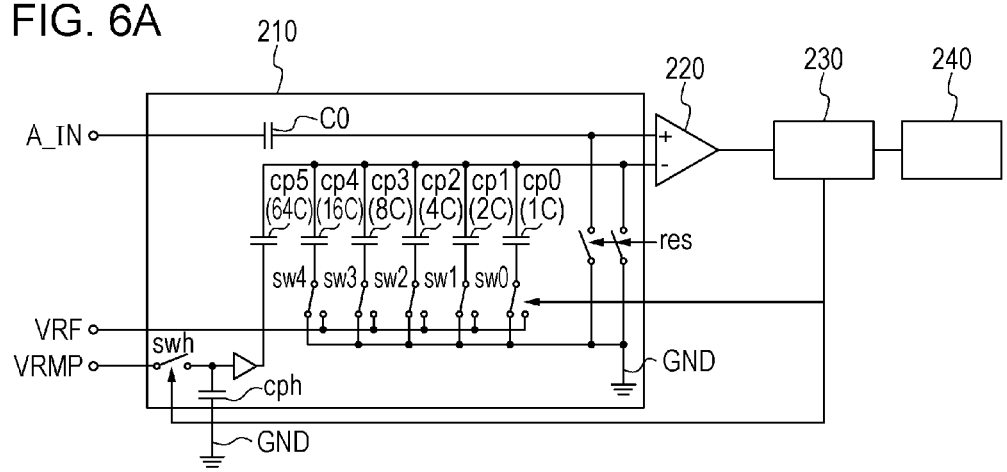
FIG. 6B
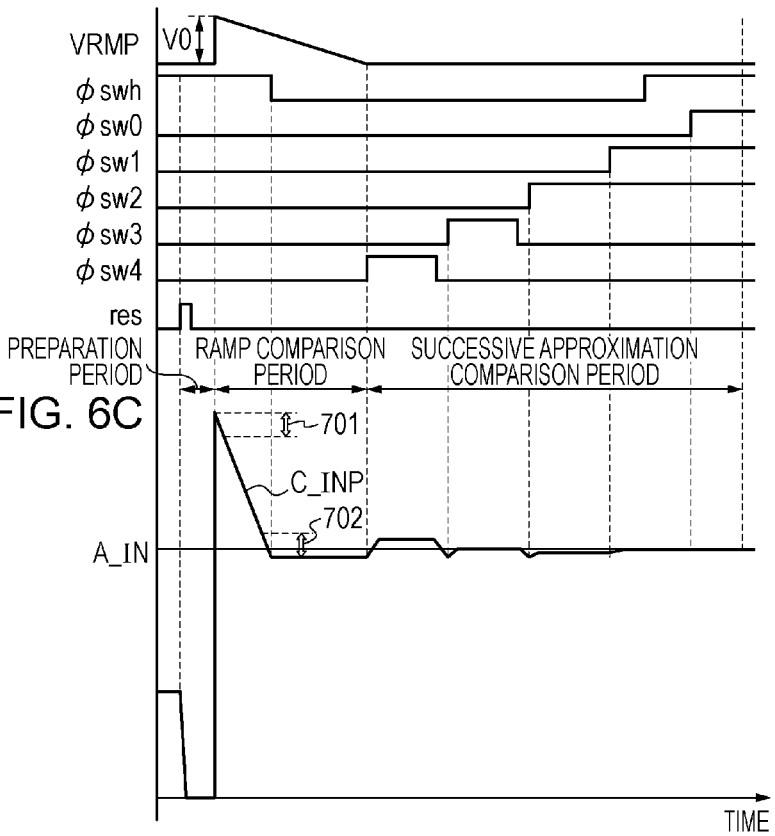
FIG. 6C

IMAGE PICKUP APPARATUS, IMAGE PICKUP SYSTEM, AND METHOD FOR DRIVING IMAGE PICKUP APPARATUS

BACKGROUND OF THE INVENTION

1. Field of the Invention

One disclosed aspect of the embodiments relates to a method for driving an image pickup apparatus having an analog-to-digital (AD) conversion unit which converts an analog signal into a digital signal, the image pickup apparatus, and an image pickup system.

2. Description of the Related Art

Image pickup apparatuses are known which have an AD conversion unit which converts an analog signal into a digital signal. As an exemplary AD conversion unit, as described in Japanese Patent Laid-Open No. 2011-114785, an image pickup apparatus is known which has an AD conversion unit which performs two stages of AD conversion. In the image pickup apparatus described in Japanese Patent Laid-Open No. 2011-114785, the AD conversion unit is operated as a successive approximation AD conversion circuit to specify a subrange. Then, the AD conversion unit is operated as a ramp AD conversion circuit using a ramp signal, to perform AD conversion on a signal in the specified subrange. Japanese Patent Laid-Open No. 2011-114785 describes a technique in which, in order to reduce occurrence of discontinuities in input-output characteristics between adjacent subranges, the AD conversion unit is used as a successive approximation AD conversion circuit to convert a test signal into a first digital signal. The value of the test signal is adjusted so that the value of the first digital signal becomes equal to a predetermined value. Then, the AD conversion unit is used as a ramp AD conversion circuit to convert the test signal whose value has been adjusted, into a second digital signal. The clock frequency for driving a circuit which generates a ramp signal is adjusted so that the value of the second digital signal becomes equal to a predetermined value. Accordingly, the change width of the potential of the ramp signal per unit time is adjusted. That is, Japanese Patent Laid-Open No. 2011-114785 describes correction of a signal used in AD conversion of an analog signal.

Japanese Patent Laid-Open No. 2011-250039 describes an image pickup apparatus having an AD conversion unit which functions as a flash AD conversion circuit which determines the higher-order bits and as a ramp AD conversion circuit which determines the lower-order bits. In the technique described in Japanese Patent Laid-Open No. 2011-250039, a potential range which is input into the flash AD conversion circuit is divided into four sections. A correction coefficient for eliminating the difference between data obtained by the ramp AD conversion circuit and ideal data which is to be obtained is calculated for each of the four sections obtained through division. The correction coefficients are used to correct a digital signal which is output by the AD conversion circuit. That is, Japanese Patent Laid-Open No. 2011-250039 describes correction of a digital signal generated through AD conversion.

SUMMARY OF THE INVENTION

In a first aspect of the embodiments, there is provided a method for driving an image pickup apparatus including a pixel configured to output a pixel signal, and an AD conversion unit configured to convert the pixel signal into a digital signal. The AD conversion unit includes a comparator configured to compare a reference signal with a signal based on the pixel signal and output a comparison result signal. The method includes determining signal values of higher-order bits of the digital signal based on the pixel signal by operating the AD conversion unit as one of a successive approximation AD conversion circuit and a ramp AD conversion circuit; and after the signal values of the higher-order bits are determined, determining signal values of lower-order bits of the digital signal based on the pixel signal by operating the AD conversion unit as the other one of the successive approximation AD conversion circuit and the ramp AD conversion circuit. When the AD conversion unit is operated as the ramp AD conversion circuit, the AD conversion unit generates a first digital signal on the basis of the comparison result signal which is output by the comparator supplied with a first ramp signal as the reference signal and a comparison signal and comparing the first ramp signal with the comparison signal; the AD conversion unit generates a second digital signal on the basis of the comparison result signal which is output by the comparator supplied with a second ramp signal as the reference signal and the comparison signal and comparing the second ramp signal with the comparison signal, the second ramp signal having a ramp start potential different from a ramp start potential of the first ramp signal; the image pickup apparatus generates a correction value on the basis of the first digital signal and the second digital signal; a first correction operation of correcting a reference potential on the basis of the correction value is performed, the reference potential being used when the AD conversion unit is operated as the successive approximation AD conversion circuit; and a second correction operation of correcting the digital signal based on the pixel signal on the basis of the correction value is performed.

In a second aspect of the embodiments, there is provided an image pickup apparatus including a pixel configured to output a pixel signal, an AD conversion unit configured to convert the pixel signal into a digital signal, and a control circuit. The AD conversion unit includes a comparator configured to compare a reference signal with a signal based on the pixel signal and output a comparison result signal. The control circuit determines signal values of higher-order bits of the digital signal based on the pixel signal by operating the AD conversion unit as one of a successive approximation AD conversion circuit and a ramp AD conversion circuit, and then determines signal values of lower-order bits of the digital signal based on the pixel signal by operating the AD conversion unit as the other one of the successive approximation AD conversion circuit and the ramp AD conversion circuit. When the control circuit causes the AD conversion unit to operate as the ramp AD conversion circuit, the AD conversion unit generates a first digital signal on the basis of the comparison result signal which is output by the comparator supplied with a first ramp signal as the reference signal and a comparison signal and comparing the first ramp signal with the comparison signal, and the AD conversion unit generates a second digital signal on the basis of the comparison result signal which is output by the comparator supplied with a second ramp signal as the reference signal and the comparison signal and comparing the second ramp signal with the comparison signal, the second ramp signal having a ramp start potential different from a ramp start potential of the first ramp signal. The image pickup apparatus further includes a signal processing circuit supplied with the first digital signal and the second digital signal. The signal processing circuit includes a circuit configured to generate a correction value on the basis of the first digital signal and the second digital signal, and a circuit configured to perform a first correction operation of correcting a reference potential used when the AD conversion unit is operated as the successive approximation AD conversion circuit, on the basis of the correction value, and a second correction operation of correcting the digital signal, into which the pixel signal is converted, on the basis of the correction value.

In a third aspect of the embodiments, there is provided an image pickup system including an image pickup apparatus, and an output signal processor. The image pickup apparatus includes a pixel configured to output a pixel signal, an AD conversion unit configured to convert the pixel signal into a digital signal, and a control circuit. The AD conversion unit includes a comparator configured to compare a reference signal with a signal based on the pixel signal and output a comparison result signal. The control circuit determines signal values of higher-order bits of the digital signal based on the pixel signal by operating the AD conversion unit as one of a successive approximation AD conversion circuit and a ramp AD conversion circuit, and then determines signal values of lower-order bits of the digital signal based on the pixel signal by operating the AD conversion unit as the other one of the successive approximation AD conversion circuit and the ramp AD conversion circuit. When the control circuit causes the AD conversion unit to operate as the ramp AD conversion circuit, the AD conversion unit generates a first digital signal on the basis of the comparison result signal which is output by the comparator supplied with a first ramp signal as the reference signal and a comparison signal and comparing the first ramp signal with the comparison signal, and the AD conversion unit generates a second digital signal on the basis of the comparison result signal which is output by the comparator supplied with a second ramp signal as the reference signal and the comparison signal and comparing the second ramp signal with the comparison signal, the second ramp signal having a ramp start potential different from a ramp start potential of the first ramp signal. The output signal processor is supplied with the first digital signal and the second digital signal. The output signal processor includes a circuit configured to generate a correction value on the basis of the first digital signal and the second digital signal, and a circuit configured to perform a first correction operation of correcting a reference potential used when the AD conversion unit is operated as the successive approximation AD conversion circuit, on the basis of the correction value, and a second correction operation of correcting the digital signal, into which the pixel signal is converted, on the basis of the correction value.

Further features of the disclosure will become apparent from the following description of exemplary embodiments with reference to the attached drawings.

BRIEF DESCRIPTION OF THE DRAWINGS

FIG. 6A is a diagram illustrating an exemplary configuration of an AD conversion unit.

FIG. 6B is a diagram illustrating an exemplary operation of the AD conversion unit.

FIG. 6C is a diagram illustrating an exemplary operation of the AD conversion unit.

DESCRIPTION OF THE EMBODIMENTS

In the image pickup apparatuses described in Japanese Patent Laid-Open No. 2011-114785 and 2011-250039, consideration is not given to how to desirably perform correction of a reference potential used in an operation of a successive approximation AD conversion circuit and correction of a digital signal generated through analog-to-digital (AD) conversion. Each of an image pickup apparatus, an image pickup system, and a method for driving the image pickup apparatus which will be described below allows desirable correction of a reference potential used in an operation of a successive approximation AD conversion circuit and desirable correction of a digital signal generated through AD conversion.

One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

First Embodiment

An image pickup apparatus according to a first embodiment will be described below with reference to the drawings.

Figure 1:
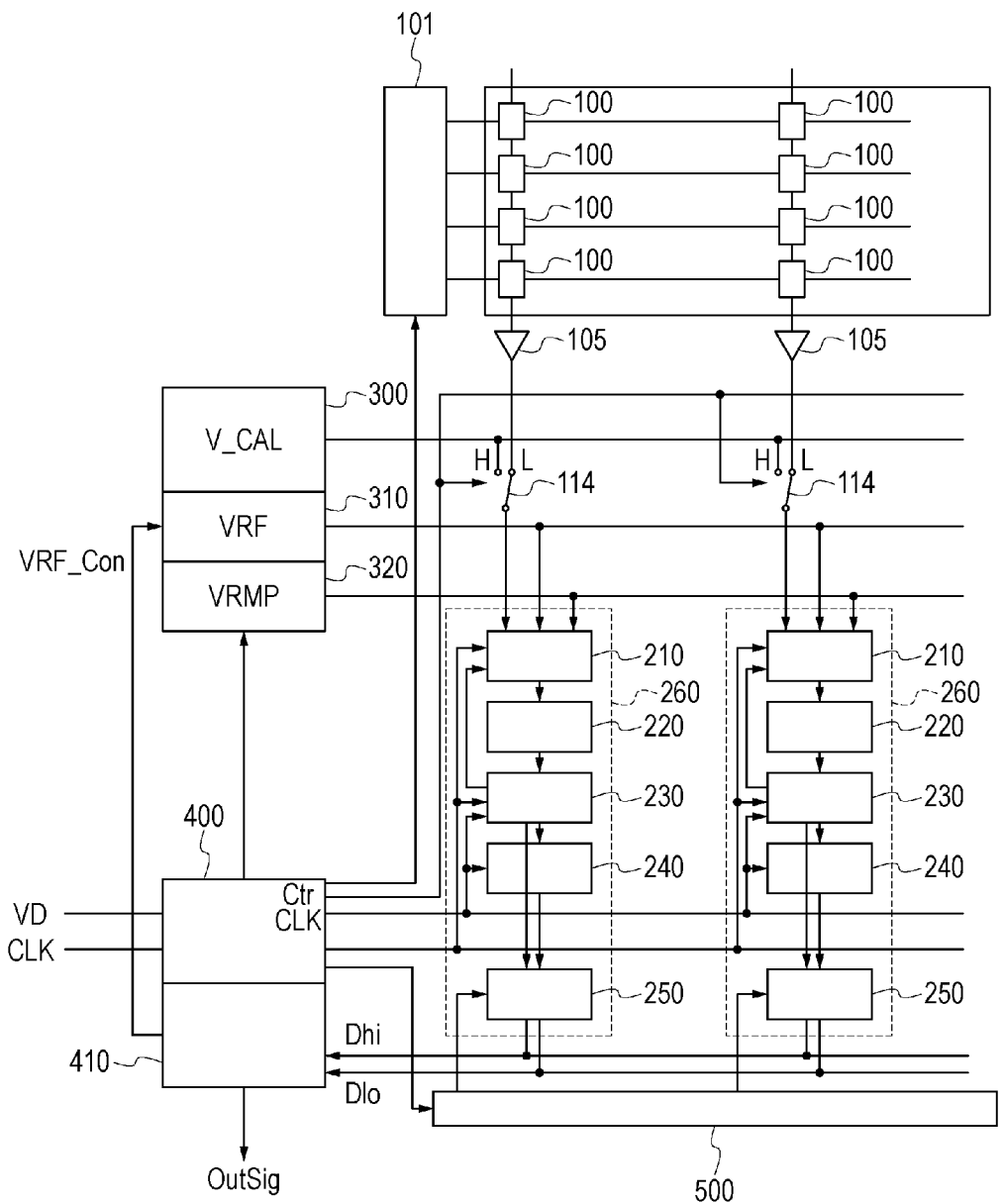
FIG. 1 is a diagram illustrating an exemplary configuration of an image pickup apparatus.

FIG. 1 is a schematic diagram illustrating an exemplary configuration of an image pickup apparatus according to the first embodiment. In the image pickup apparatus according to the first embodiment, pixels 100, each of which outputs a pixel signal, are arranged in a matrix. The pixels 100 are scanned line by line by a vertical scan circuit 101, and pixel signals generated through photoelectric conversion of incident light are output to amplifier units 105. The vertical scan circuit 101 scans the pixels 100 line by line on the basis of a signal supplied from a timing generator 400. Each of the pixel signals supplied to a corresponding one of the amplifier units 105 is amplified on the basis of a gain of the amplifier unit 105, and is output via a corresponding one of switches 114 to a comparison input unit 210 included in a corresponding one of AD conversion units 260. Each of the AD conversion units 260 includes a comparison input unit 210, a comparator 220, a control circuit 230, a counter 240, and a memory 250. A signal which is output by the amplifier unit 105 is referred to as an amplified pixel signal. The comparison input unit 210 in a corresponding one of columns is supplied with a reference potential VRF from a reference potential supply circuit 310 and with a ramp signal VRMP from a ramp signal supply circuit 320. The comparator 220 outputs a comparison result signal CMP based on a result obtained by comparing a signal based on the reference potential VRF with an amplified pixel signal. The AD conversion unit 260 generates a digital signal Dhi corresponding to the higher-order m bits in N bits, on the basis of the comparison result signal CMP. In addition, the comparator 220 outputs the comparison result signal CMP by comparing the ramp signal VRMP with a signal based on the amplified pixel signal. The AD conversion unit 260 generates a digital signal Dlo corresponding to the lower-order n bits in the N bits, on the basis of the comparison result signal CMP. A relation N=m+n holds for N, m, and n.

The control circuit 230 operates the comparison input unit 210, the counter 240, and the memory 250 on the basis of a signal from the timing generator 400 and the comparator 220. The counter 240 is supplied with a clock signal CLK from the timing generator 400. The control circuit 230 causes the counter 240 to start counting the clock signal CLK in response to an operation in which the ramp signal supply circuit 320 starts changing the potential of a ramp signal VRMP depending on time. The control circuit 230 causes the memory 250 to store the digital signal Dhi and the digital signal Dlo.

A horizontal scan circuit 500 sequentially transfers digital signals Dhi and digital signals Dlo stored in the memories 250 in the columns to a signal processing circuit 410, on the basis of the signal from the timing generator 400. The signal processing circuit 410 outputs an image pickup signal OutSig on the basis of the digital signals Dhi and the digital signals Dlo. The timing generator 400 is supplied with the clock signal CLK and a vertical synchronizing signal VD. The timing generator 400 causes the vertical scan circuit 101 to scan the pixels 100 line by line on the basis of the vertical synchronizing signal VD.

The image pickup apparatus according to the first embodiment further includes a test signal supply circuit 300. The test signal supply circuit 300 outputs a test signal V_CAL to the switches 114 provided for the columns. Each of the switches 114 electrically connects the amplifier unit 105 to the comparison input unit 210 when the timing generator 400 sets a control signal Ctr to the Low level (hereinafter, referred to as the L level), whereas the switch 114 electrically connects the test signal supply circuit 300 to the comparison input unit 210 when the timing generator 400 sets the control signal Ctr to the High level (hereinafter, referred to as the H level).

Figure 2A:
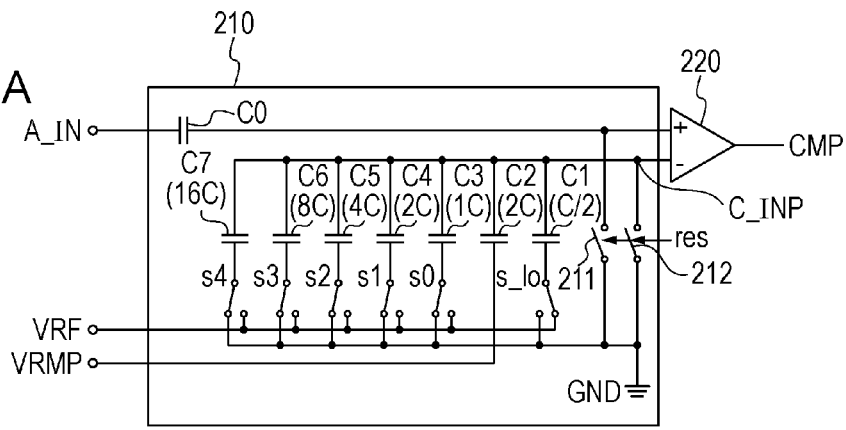
FIG. 2A is a diagram illustrating an exemplary configuration of an analog-to-digital (AD) conversion unit.

FIG. 2A illustrates an exemplary configuration of the comparison input unit 210 and the comparator 220.

An analog signal A_IN which is output from the switch 114 is supplied to the non-inverting input node of the comparator 220 via a capacitive element C0. When a switch 211 is brought into conduction, a first node of the capacitive element C0 is reset to the ground potential. To make the description understandable, the description is made in which the node is reset to the ground potential. In an actual circuit, the node is reset to a potential obtained by taking into account an input range of the comparator. First nodes of capacitive elements C1, C2, C3, C4, C5, C6, and C7 are electrically connected in parallel to the inverting input node of the comparator 220. In addition, second nodes of the capacitive elements C1, C3, C4, C5, C6, and C7 are electrically connected to the inverting input node of the comparator 220 via switches s_lo, s0, s1, s2, s3, and s4, respectively, and via a switch 212. A signal supplied to the inverting input node of the comparator 220 is referred to as a signal C_INP. The symbol INP stands for Input.

The switches s_lo, s0, s1, s2, s3, and s4 are supplied with the reference potential VRF. A second node of the capacitive element C2 is supplied with the ramp signal VRMP. In the case where the capacitance of the capacitive element C3 is set to 1C, the capacitances of the capacitive elements C4, C5, C6, and C7 are set to 2C, 4C, 8C, and 16C, respectively. The capacitances of the capacitive elements C1 and C2 are set to C/2 and 2C, respectively. In FIG. 2A, the capacitances of the capacitive elements are indicated in parentheses. The switches 211 and 212 are brought into conduction when a reset signal res is set to the H level. The switches s_lo, s0, s1, s2, s3, and s4 supply the reference potential VRF to the respective capacitive elements when control signals supplied to the respective switches are set to the H level. The switches s_lo, s0, s1, s2, s3, and s4 supply the ground potential to the respective capacitive elements when the control signals supplied to the respective switches are set to the L level. In the case where the control signal supplied to each of the switches s_lo, s0, s1, s2, s3, and s4 is set to the L level, when the switch 212 is brought into conduction, charge in a corresponding one of the capacitive elements C1, C3, C4, C5, C6, and C7 is reset. The comparison input unit 210 is a signal supply circuit in the first embodiment. The signal which is output from the comparison input unit 210 to the comparator 220 is a reference signal.

Figure 2B:
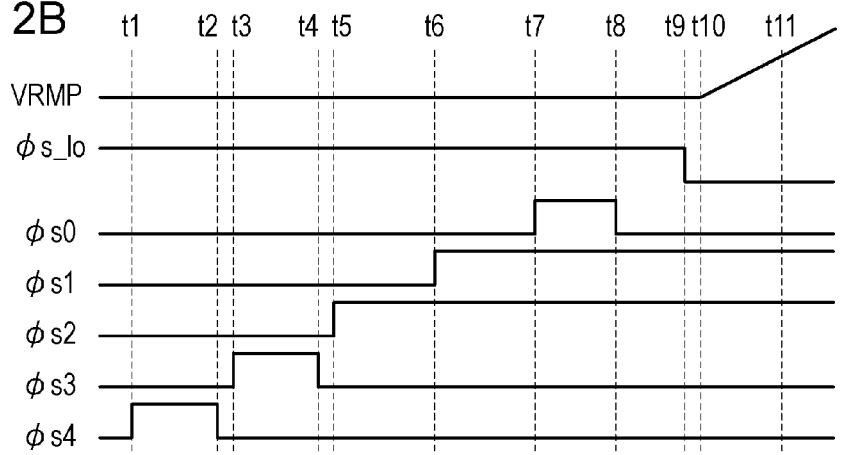
FIG. 2B is a diagram illustrating an exemplary operation of the AD conversion unit.
Figure 2C:
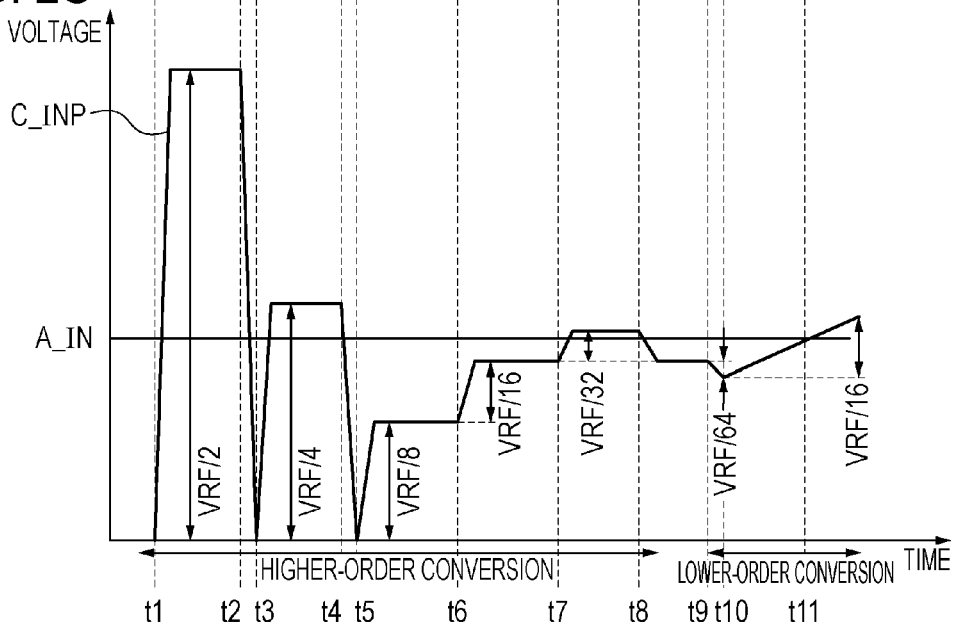
FIG. 2C is a diagram illustrating an exemplary operation of the AD conversion unit.

An operation of the comparison input unit 210 and the comparator 220 illustrated in FIG. 2A will be described with reference to FIGS. 2B and 2C. FIGS. 2B and 2C illustrate an operation in which an amplified pixel signal based on a pixel signal which is output from a corresponding one of the pixels 100 is converted into a digital signal. During this operation, the control signal Ctr supplied to the switch 114 is set to the L level, and the electrical path between the amplifier unit 105 and the comparison input unit 210 is brought into conduction.

FIG. 2B illustrates the potentials of control signals $\phi$s_lo, $\phi$s0, $\phi$s1, $\phi$s2, $\phi$s3, and $\phi$s4 supplied to the switches s_lo, s0, s1, s2, s3, and s4, respectively, and the potential of the ramp signal VRMP. FIG. 2C illustrates the potential of the analog signal A_IN which is output from the switch 114, and the potential of the signal C_INP.

Times t1 to t11 illustrated in FIG. 2B correspond to times t1 to t11 illustrated in FIG. 2C, respectively.

Before time t1, the reset signal res is set to the H level so that the first nodes of the capacitive elements C0 and C2 are reset. In addition, the charge in the capacitive elements C1, and C3 to C7 is reset. After the reset signal res is set to the L level, the amplified pixel signal is supplied to the non-inverting input node of the comparator 220 via the capacitive element C0. In the operation in FIGS. 2B and 2C, the amplified pixel signal is the analog signal A_IN supplied from the switch 114 to the non-inverting input node of the comparator 220.

At time t1, the control signal $\phi$s4 is set to the H level. The other control signals $\phi$s_lo, $\phi$s0, $\phi$s1, $\phi$s2, and $\phi$s3 are set to the L level. The ramp signal VRMP is at a ramp start potential rmp_st. Setting the control signal $\phi$s4 to the H level causes the potential of the signal C_INP to be set to VRF/2. In the case of the circuit diagram illustrated in FIG. 2A, the potential of the signal C_INP increases to a value obtained by multiplying the VRF by 16/33.5 which is a ratio of the capacitance of the capacitive element C7, i.e., 16C, to the total of the capacitances of the capacitive elements C1 to C7, i.e., 33.5C. In an actual circuit, the capacitances of the capacitive elements C1 to C7 are set in consideration of parasitic capacitance so that a binary ratio holds. In the first embodiment, the potential of the signal C_INP indicates VRF/2 under the assumption that a binary ratio holds with the capacitive elements in the comparison input unit 210. Since the potential of the signal C_INP is higher than that of the analog signal A_IN, the comparator 220 outputs the comparison result signal CMP having a signal value "0" to the control circuit 230.

The control circuit 230 sets the control signal φs4 to the L level at time t2, and sets the control signal φs3 to the H level at time t3. Thus, the potential of the signal C_INP becomes a potential of VRF/4. Since the potential of the signal C_INP is higher than that of the analog signal A_IN, the comparator 220 outputs the comparison result signal CMP having a signal value of "0" to the control circuit 230.

The control circuit 230 sets the control signal φs3 to the L level at time t4, and sets the control signal φs2 to the H level at time t5. Thus, the potential of the signal C_INP becomes VRF/8. Since the potential of the analog signal A_IN is higher than that of the signal C_INP, the comparator 220 outputs the comparison result signal having a signal value of "1" to the control circuit 230.

Whereas the control circuit 230 keeps the control signal φs2 at the H level, the control circuit 230 sets the control signal φs1 to the H level at time t6. Thus, the potential of the signal C_INP becomes a potential higher than that at time t5 by VRF/16. Since the potential of the analog signal A_IN is higher than that of the signal C_INP, the comparator 220 outputs the comparison result signal CMP having a signal value of "1" to the control circuit 230.

Whereas the control circuit 230 keeps the control signal φs1 at the H level, the control circuit 230 sets the control signal φs0 to the H level at time t7. Thus, the potential of the signal C_INP becomes a potential higher than that at time t6 by VRF/32. The change range of the potential of the signal C_INP, i.e., VRF/32, is a potential difference which is generated to obtain the signal value of the least significant bit among the higher-order bits. Since the potential of the signal C_INP is higher than that of the analog signal A_IN, the comparator 220 outputs the comparison result signal CMP having a signal value of "0" to the control circuit 230. Thus, the signal values of the higher-order 5 bits of the digital signal which are a result of AD conversion of the analog signal A_IN is "00110". This operation of obtaining the signal values of the higher-order 5 bits is a higher-order bit acquisition operation.

The control circuit 230 sets the control signal φs0 to the L level at time t8. Thus, the potential of the signal C_INP becomes the potential at time t7. The control circuit 230 sets the control signal φs_lo to the L level at time t9. Thus, the potential of the signal C_INP becomes a potential lower than that at time t8 by VRF/64.

At time t10, the ramp signal supply circuit 320 starts changing the potential of the ramp signal VRMP depending on time. The counter 240 starts counting the clock signal CLK in response to the operation of starting changing the potential of the ramp signal VRMP.

The magnitude relationship between the potential of the signal C_INP and that of the analog signal A_IN becomes reversed at time t11. That is, the signal value of the comparison result signal CMP which is output from the comparator 220 is changed from "1" to "0". At that time, the counter 240 holds a count signal CNT generated through the counting of the clock signal CLK. The count signal CNT is an 8-bit digital signal. This operation of obtaining signal values of the lower-order 8 bits is a lower-order bit acquisition operation. The higher-order bit acquisition operation and the lower-order bit acquisition operation allow AD conversion of the analog signal A_IN into the higher-order 5 bits and the lower-order 8 bits, i.e., 13 bits in total.

A correction value acquisition operation according to the first embodiment will be described with reference to FIG. 3.

The timing generator 400 sets the control signal Ctr supplied to the switch 114 to the H level so as to electrically connect the test signal supply circuit 300 to the comparison input unit 210. A control signal (not illustrated) supplied to each of the switches s1, s2, s3, and s4 is set to the L level during the correction operation.

At and before time t20, the control signal Ctr is set to the H level, and the test signal V_CAL is supplied to the comparison input unit 210. The control signal φs0 and the reset signal res are set to the H level, and the first input node of the capacitive elements C0, C1, and C3 are set to the ground potential.

At time t20, the reset signal res is set to the L level. Thus, the capacitive element C0 holds charge based on the test signal V_CAL supplied at time t20. The control signal φs_lo is set to the L level. Thus, the potential of the signal C_INP becomes lower than that before time t20 by VRF/64. The signal which has a potential obtained at time t20 and which is supplied to the non-inverting input node of the comparator 220 is a comparison signal. The capacitances of the capacitive elements supplied with the reference potential VRF at time t20 constitute a first capacitance. The first capacitance is a total of the capacitances of capacitive elements which are supplied with the reference potential VRF and which are selected from the capacitive elements. One or more capacitive elements supplied with the reference potential VRF may be used. In the first embodiment, the first capacitance is constituted by the capacitance C3.

At time t21, changing the potential of the ramp signal VRMP depending on time is started. The counter 240 starts counting the clock signal CLK in response to the operation of starting changing the potential of the ramp signal VRMP. FIG. 3 illustrates the clock signal counted by the counter 240 as CNT.

At time t22, the signal value of the comparison result signal CMP which is output by the comparator 220 changes from "1" to "0". At that time, the counter 240 holds the count signal CNT generated through the counting of the clock signal CLK. This count signal CNT is referred to as count data 1. The count data 1 is a first digital signal based on the first ramp signal.

At time t23, the change of the potential of the ramp signal VRMP which depends on time is completed, and the potential of the signal C_INP goes back to the potential obtained at time t21.

At time t24, the control signal φs0 is set to the L level. Thus, the potential of the signal C_INP decreases by VRF/32 from the potential obtained at time t23. The change range of the potential of the signal C_INP, i.e., VRF/32, is a potential difference generated to obtain the signal value of the least significant bit among the higher-order bits. The capacitances of the capacitive elements supplied with the reference potential VRF at time t24 constitute a second capacitance. The second capacitance is a total of the capacitances of capacitive elements which are supplied with the reference potential VRF and which are selected from the capacitive elements. In the first embodiment, the second capacitance is equal to zero.

At time t25, changing the potential of the ramp signal VRMP depending on time is started. The counter 240 starts counting the clock signal CLK in response to the operation of starting changing the potential of the ramp signal VRMP.

At time t26, the signal value of the comparison result signal CMP which is output by the comparator 220 changes from "1" to "0". At that time, the counter 240 holds the count signal CNT generated through the counting of the clock signal CLK. This count signal CNT is referred to as count data 2. The count data 2 is a second digital signal based on the second ramp signal.

At time t27, the change of the potential of the ramp signal VRMP which depends on time is completed, and the potential of the signal C_INP goes back to the potential obtained at time t25.

Figure 3:
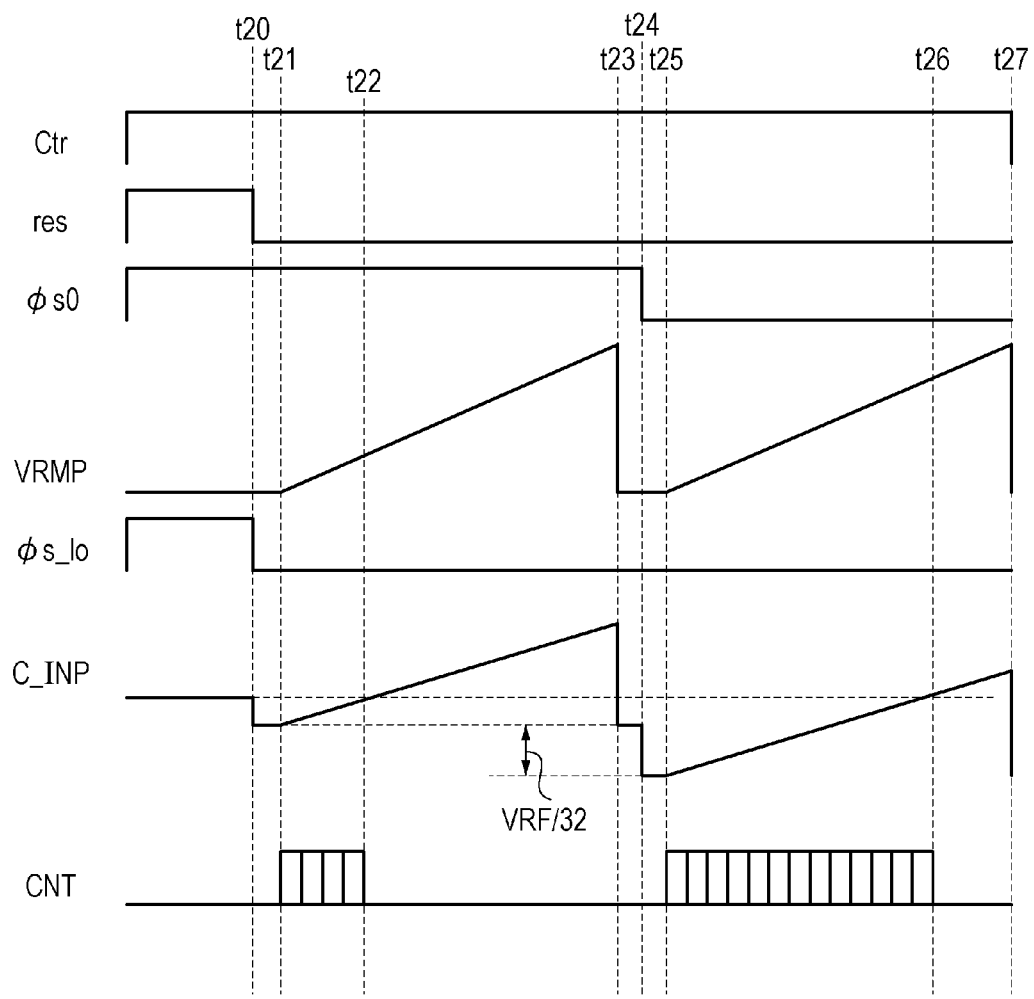
FIG. 3 is a diagram illustrating an exemplary correction operation of the AD conversion unit.

In the operation illustrated in FIG. 3, the difference between the count data 2 and the count data 1 is a value obtained through AD conversion of the potential difference for one step in the higher-order subrange into 8 bits. That is, if the AD conversion characteristic of the AD conversion unit 260 is ideal, the value obtained by subtracting the count data 1 from the count data 2 which are generated is equal to 256 in decimal. Therefore, a correction value α is obtained by subtracting the count data 1 from the count data 2 which are actually obtained. Through the operation illustrated in FIG. 3, the count data 2 and the count data 1 are output from the memory 250 to the signal processing circuit 410.

Figure 4A:
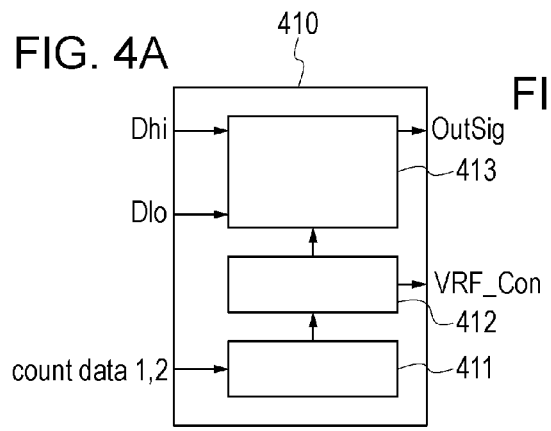
FIG. 4A is a diagram illustrating an exemplary configuration of a signal processing circuit.

FIG. 4A illustrates an exemplary configuration of the signal processing circuit 410. The signal processing circuit 410 includes a correction value acquisition circuit 411, a correction value register 412, and a correction operation circuit 413. The correction value acquisition circuit 411 is supplied with the count data 1 and the count data 2 from the memory 250. The correction value acquisition circuit 411 obtains a correction value α by subtracting the count data 1 from the count data 2, and outputs the correction value α to the correction value register 412. The correction value register 412 holds the correction value α, and outputs a VRF control signal VRF_Con for adjusting the potential of the reference potential VRF to the reference potential supply circuit 310 so that the correction value α becomes close to 256. The reference potential supply circuit 310 changes the potential of the reference potential VRF on the basis of the VRF control signal VRF_Con. Then, the correction value acquisition operation described with reference to FIG. 3 is performed again. A signal supplied to the non-inverting input node of the comparator 220 on the basis of the reference potential VRF whose potential has been changed is a second comparison signal. The count data 1 and the count data 2 which are obtained again are a third digital signal and a fourth digital signal, respectively. The correction value acquisition circuit 411 obtains a correction value α again from the count data 1 and the count data 2 which are obtained again. The correction value α which is obtained the second time is a second correction value. Depending on the correction value α which is obtained the second time, the correction value register 412 outputs the VRF control signal VRF_Con to the reference potential supply circuit 310 if it is necessary to further change the potential of the reference potential VRF. If it is not necessary to change the potential of the reference potential VRF, the correction value register 412 outputs the correction value α which is obtained the second time to the correction operation circuit 413.

The correction operation circuit 413 corrects at least one of the digital signals Dhi and Dlo generated on the basis of a pixel signal, by using the correction value α which is output from the correction value register 412. The correction operation circuit 413 outputs the corrected digital signal as an image pickup signal OutSig.

An exemplary correction of a digital signal which is performed by the correction operation circuit 413 will be further described with reference to FIGS. 4B and 4C.

Figure 4B:
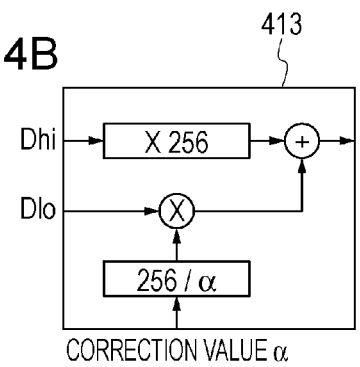
FIG. 4B is a diagram illustrating an exemplary correction operation.

FIG. 4B illustrates a configuration of the correction operation circuit 413 for correcting the digital signal Dlo on the basis of the correction value α. The correction operation circuit 413 divides 256 by the correction value α. Then, the correction operation circuit 413 multiplies the division result by the digital signal Dlo. Thus, the digital signal Dlo is corrected. The correction operation circuit 413 outputs a signal obtained by adding the digital signal Dhi to the corrected digital signal Dlo, as the image pickup signal OutSig. If AD conversion performed by the AD conversion unit 260 is ideal, α=256, and the division result is equal to 1. Accordingly, the correction operation circuit 413 outputs a signal obtained by adding a signal obtained by multiplying the digital signal Dhi by 256, to the digital signal Dlo.

Figure 4C:
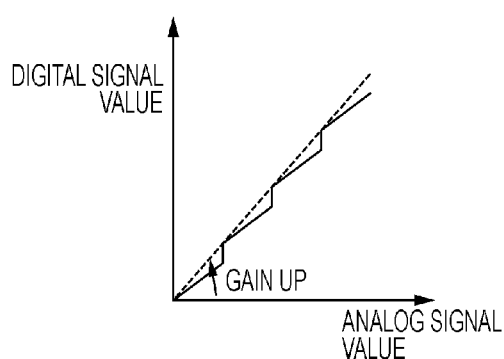
FIG. 4C is a diagram illustrating an exemplary correction operation.

FIG. 4C illustrates a correlation relationship between the signal value of an analog signal and the signal value of a digital signal obtained through AD conversion of the analog signal. A correlation relationship before correction is illustrated by using a solid line, and an ideal correlation relationship is illustrated by using a dashed line. If the input-output characteristic of the AD conversion unit 260 is ideal, an increase in the signal value of an analog signal linearly increases the signal value of the digital signal. The gain of the AD conversion for the lower-order n bits which is indicated by the solid line is lower than that indicated by the dashed line. That is, since α<256, the division result is larger than 1. In this configuration, the division result is multiplied by the digital signal Dlo as illustrated in FIG. 4B. Therefore, an increase in the signal value of the digital signal which is caused by an increase in the signal value of the analog signal can be made close to linear compared with that before the correction.

Another configuration of the correction operation circuit 413 for correction will be described with reference to FIGS. 4D and 4E.

Figure 4D:
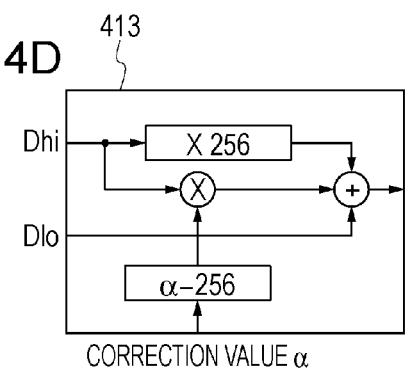
FIG. 4D is a diagram illustrating an exemplary correction operation.

FIG. 4D illustrates a configuration of the correction operation circuit 413 for correcting the digital signal Dhi on the basis of the correction value α. The correction operation circuit 413 subtracts 256 from the correction value α. Then, the correction operation circuit 413 multiples the subtraction result by the digital signal Dhi. The correction operation circuit 413 adds the multiplication result to a signal value obtained by multiplying the digital signal Dhi by 256. The correction operation circuit 413 further adds the addition result to the digital signal Dlo, and outputs the result as the image pickup signal OutSig.

Figure 4E:
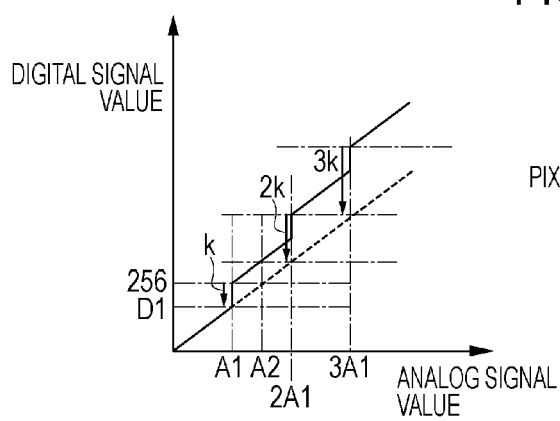
FIG. 4E is a diagram illustrating an exemplary correction operation.

FIG. 4E illustrates a correlation relationship between the signal value of an analog signal and the signal value of a digital signal obtained through AD conversion of the analog signal. A correlation relationship before correction is illustrated by using a solid line, and an ideal correlation relationship is illustrated by using a dashed line. The higher-order 5 bits are obtained through AD conversion, and the lower-order bits are obtained through AD conversion in 8 bits. Therefore, in the signal values of the higher-order 5 bits, a value of 1 for the least significant bit (LSB) is subdivided into 256 stages. The vertical axis represents a digital signal value in decimal. In the case of the ideal state indicated with a dashed line, a digital signal value of 256 is obtained for an analog signal value of A2. In contrast, in the state before correction which is indicated with a solid line, a digital signal value of 256 is obtained for an analog signal value of A1. That is, in the case of the state indicated with a dashed line, the AD conversion result for the higher-order 5 bits increases by 1 for every analog signal value of A2, whereas, in the case of the state indicated with a solid line, the AD conversion result for the higher-order 5 bits increases by 1 for every analog signal value of A1. The range of the analog signal which corresponds to one bit in AD conversion of the higher-order 5 bits is a range from 0 to A1 which is narrower than that from 0 to A2 produced in the case where the characteristic is ideal. Therefore, the correction value α obtained by performing the correction value acquisition operation illustrated in FIG. 3 is less than 256. Accordingly, the value obtained by subtracting 256 from α is negative. The digital signal Dhi corresponding to the higher-order bits is multiplied by the subtraction result obtained by subtracting 256 from α. Assume that correction is performed by k for the analog signal A1. The digital signal obtained through AD conversion of the higher-order 5 bits is to be corrected by k every time the magnitude of the analog signal increases by A1. That is, the digital signal is corrected in such a manner that the value is decreased by k for A1, by 2k, i.e., the doubled value, for 2A1, and by 3k, i.e., the tripled value, for 3A1. Thus, correction of the digital signal Dhi using the correction operation in FIG. 4D allows an increase in the signal value of a digital signal which is caused by an increase in the signal value of an analog signal, to be made close to linear compared with that before the correction.

As described above, in the first embodiment, the reference potential VRF is corrected in a first correction operation, and a digital signal is corrected in a second correction operation. In general, achieving a digital-to-analog (DA) converter which outputs a high-accuracy reference potential VRF tends to cause an increase in complexity and size of the circuit. As a correction coefficient increases, miscoding in which a digital signal value is not output for a corresponding analog signal value which is input likely occurs in correction of a digital signal. For example, a case of a digital gain of 1.1 will be compared with a case of a digital gain of 1.5. In the case of a digital gain of 1.1, when the signal values of a digital signal before correction are "6", "7", "8", "9", "10", and "11" in decimal, the signal values of the digital signal which are output after correction will be "6", "7", "8", "9", "11", and "12". In this case, miscoding occurs for one value of "10" in the corrected digital signal. In contrast, in the case of a digital gain of 1.5, when the signal values of a digital signal before correction are the same as those in the case of a digital gain of 1.1, the signal values of the digital signal which are output after correction will be "9", "10", "12", "13", "15", and "16". In this case, miscoding occurs for two values of "11" and "14" in the corrected digital signal. Thus, as a correction coefficient increases, miscoding likely occurs. As a correction coefficient increases, a quantization error is also processed by using the gain, resulting in a likelihood of an increase in the error. Thus, in correction of a digital signal, an increase in a correction coefficient may cause miscoding, or may increase a quantization error, resulting in a reduction in AD conversion accuracy. Therefore, it is desirable to combine the correction of the reference potential VRF and the correction of a digital signal in a balanced manner. In the improvement of linearity of AD conversion which is caused by the correction of the reference potential VRF, a correction coefficient can be obtained which is larger than that obtained through the correction of a digital signal, but the correction accuracy is low. Therefore, in the first embodiment, a rough adjustment is first performed in which the reference potential VRF is corrected on the basis of a correction value α. Then, a fine adjustment is performed in which a digital signal is corrected on the basis of the correction value α. Thus, compared with the case in which a digital signal is not corrected and in which only the reference potential VRF is corrected, circuit complexity of the reference potential supply circuit 310 can be reduced, and an increase in the circuit size can be suppressed. In addition, linearity in AD conversion can be improved.

In the first embodiment, the potential of the reference potential VRF is corrected in the first correction operation. Other than that, as in the image pickup apparatus described in Japanese Patent Laid-Open No. 2011-114785, a method is used in which a potential change per unit time in the ramp signal VRMP is corrected. In the case where a potential change per unit time in the ramp signal VRMP is corrected, reduction in linearity of the ramp signal VRMP may cause reduction in linearity of AD conversion. Suppression of reduction in linearity of the ramp signal VRMP easily causes an increase in circuit complexity and circuit size of the ramp signal supply circuit 320. In contrast, the potential of the reference potential VRF may be made constant. Therefore, correction of the reference potential VRF is easily performed compared with correction of the ramp signal VRMP, and has an effect that reduction in linearity caused by the correction hardly occurs.

In the image pickup apparatus described in Japanese Patent Laid-Open No. 2011-114785, a clock frequency for driving a circuit which generates a ramp signal is adjusted, resulting in a problem in that the circuit is made complex. In the image pickup apparatus according to the first embodiment, a clock frequency is not changed. Instead, correction of at least one of the digital signals Dhi and Dlo and correction of the potential of the reference potential VRF allow linearity in AD conversion to be improved. That is, the image pickup apparatus according to the first embodiment has an effect that linearity in AD conversion is improved while the circuit complexity is suppressed.

In the image pickup apparatus described in Japanese Patent Laid-Open No. 2011-250039, the potential width which is input to the flash AD conversion circuit is divided into four sections. A correction coefficient is calculated for each of the four sections obtained through division. Using the correction coefficients, a digital signal which is output by the AD conversion unit is corrected. In contrast, according to the first embodiment, without obtaining multiple correction values α, an AD conversion accuracy error between the higher-order bits and the lower-order bits can be reduced. For example, only one correction value α is used in the second correction operation within a range from the minimum value to the maximum value of a digital signal which is output by the AD conversion unit 260. The minimum value of a digital signal which is output by the AD conversion unit 260 is "0000000000000" in binary if the digital signal has 13 bits. Similarly, the maximum value is "1111111111111" if the digital signal has 13 bits. In the first embodiment, the number of correction values α can be reduced so as to be smaller than that for the image pickup apparatus described in Japanese Patent Laid-Open No. 2011-250039. Thus, an operation which is necessary in the image pickup apparatus described in Japanese Patent Laid-Open No. 2011-250039 can be skipped. In this operation, it is determined which section among the four sections corresponds to an analog signal which is to be converted into a digital signal. Then, a correction coefficient is selected to perform correction. In addition, in the first embodiment, the amount of a memory storing a correction coefficient is smaller than that in the image pickup apparatus described in Japanese Patent Laid-Open No. 2011-250039.

To suppress reduction in linearity in AD conversion of the image pickup apparatus, it is desirable to increase an AD conversion accuracy for one step in the higher-order sub-range. Therefore, in the first embodiment, the configuration is described in which a correction value α is obtained by using one step in the higher-order subrange. Another configuration may be employed in which a correction value α is obtained by using more than one step in the higher-order subrange. For example, AD conversion using the ramp signal VRMP may be performed on the potential difference using the capacitive element C4 for two steps in the higher-order subrange so as to obtain a correction value α. Correction values α of the AD conversion units 260 may be held in the correction value register 412. However, in the image pickup apparatus having the AD conversion units 260 provided in such a manner that the AD conversion units 260 correspond to the pixel columns, the number of AD conversion units 260 is typically up to several thousands in many cases. When the correction values α of several thousands of AD conversion units 260 are held in the correction value register 412, the size of the correction value register 412 may increase. For example, an average of the correction values α of the AD conversion units 260 may be obtained, and the correction value register 412 may hold the average of the correction values α. The correction operation circuit 413 may use the average of the correction values α to correct a digital signal. The average of the correction values α may be an average of all of the correction values α of the AD conversion units 260 included in the image pickup apparatus. Alternatively, the average of the correction values α may be obtained for each block obtained by dividing the AD conversion units 260 included in the image pickup apparatus into blocks.

The signal value of the test signal V_CAL may be changed as appropriate. In general, as the signal level of a pixel signal is lower, a nonlinear error more easily affects the signal. To suppress reduction in signal accuracy of a signal which is output from the image pickup apparatus, the AD conversion unit requires high AD conversion accuracy when the signal level of a pixel signal is low. Therefore, the test signal supply circuit 300 desirably supplies the test signal V_CAL having a potential based on the minimum value of the signal level of a pixel signal, to each of the AD conversion units 260. The potential based on the minimum value of the signal level of a pixel signal according to the first embodiment is the potential of a signal obtained in such a manner that the amplifier unit 105 amplifies a noise signal which is output from a pixel and outputs the amplified signal.

Figure 4F:
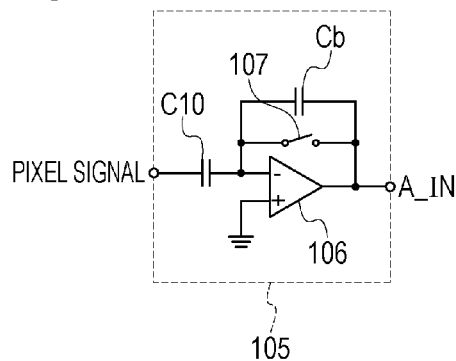
FIG. 4F is a diagram illustrating an exemplary configuration of an amplifier unit.

In the first embodiment, the potential which is output when the amplifier unit 105 is reset may be the potential of the test signal V_CAL. An exemplary configuration of the amplifier unit 105 according to the first embodiment is illustrated in FIG. 4F.

A pixel signal is supplied to an amplifier 106 via an amplifier-unit input capacitance C10. The output node and the input node of the amplifier 106 are electrically connected to each other via a feedback capacitance Cb. The amplifier unit 105 includes a switch 107 for resetting charge in both of the nodes of the feedback capacitance Cb. The potential which is output when the amplifier unit 105 is reset is the potential which is output when the switch 107 is conducting.

The minimum value of the signal level of a pixel signal may be a signal value based on a noise signal which is output from a pixel. The signal value based on the noise signal may be a signal value of the noise signal as it is, or may be a signal value obtained by correcting the signal value of the noise signal. Another example of the minimum value of the signal level of a pixel signal may be a signal value based on a pixel signal which is output, for example, from an optical black pixel which is shielded, or may be a signal value based on a constant pixel signal which is output from a reference pixel having a pixel configuration without a photoelectric conversion unit.

In the first embodiment, AD conversion is performed to obtain the higher-order 5 bits and the lower-order 8 bits. The number of bits may be changed depending on design as appropriate.

In the first embodiment, the configuration is described in which a correction value is generated on the basis of the difference between the first digital signal and the second digital signal. However, the disclosure is not limited to this. For example, a configuration may be employed in which a ratio of the first digital signal to the second digital signal is used to obtain a correction value. That is, any configuration may be employed as long as the first digital signal and the second digital signal are used to generate a correction value.

Second Embodiment

A second embodiment will be described with reference to the drawings, by focusing on points different from those in the first embodiment.

Figure 5A:
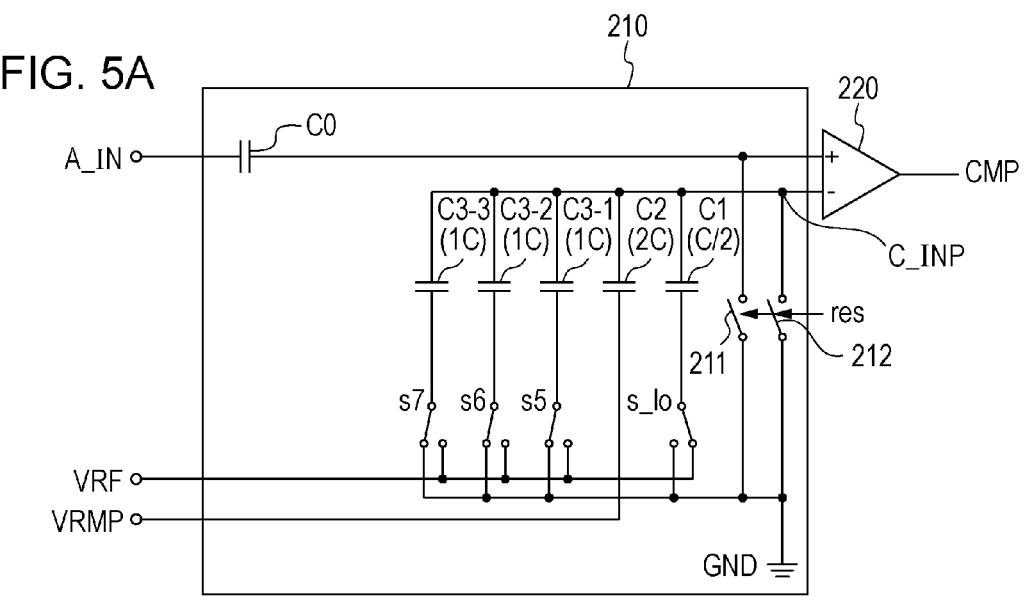
FIG. 5A is a diagram illustrating an exemplary configuration of an AD conversion unit.

FIG. 5A illustrates another exemplary configuration of the comparison input unit 210 according to the second embodiment. In FIG. 5A, components having the same functions as those in FIG. 2A are designated with identical reference characters used in FIG. 2A. In the second embodiment, instead of the capacitive elements C3 to C7, first input nodes of capacitive elements C3-1, C3-2, and C3-3 are electrically connected to the inverting input node of the comparator 220. The capacitive elements C3-1, C3-2, and C3-3 each have the same capacitance 1C. Switches s5, s6, and s7 are used to supply the reference potential VRF or the ground potential to second input nodes of the capacitive elements C3-1, C3-2, and C3-3, respectively. The switches s5, s6, and s7 are supplied with control signals φs5, φs6, and φs7, respectively, from the timing generator 400.

Figure 5B:
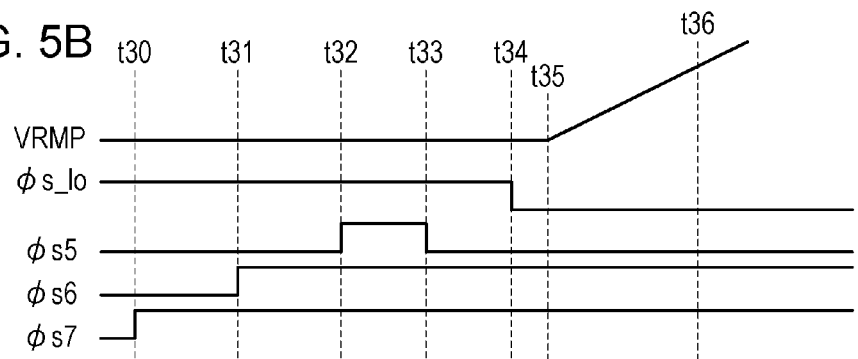
FIG. 5B is a diagram illustrating an exemplary operation of the AD conversion unit.
Figure 5C:
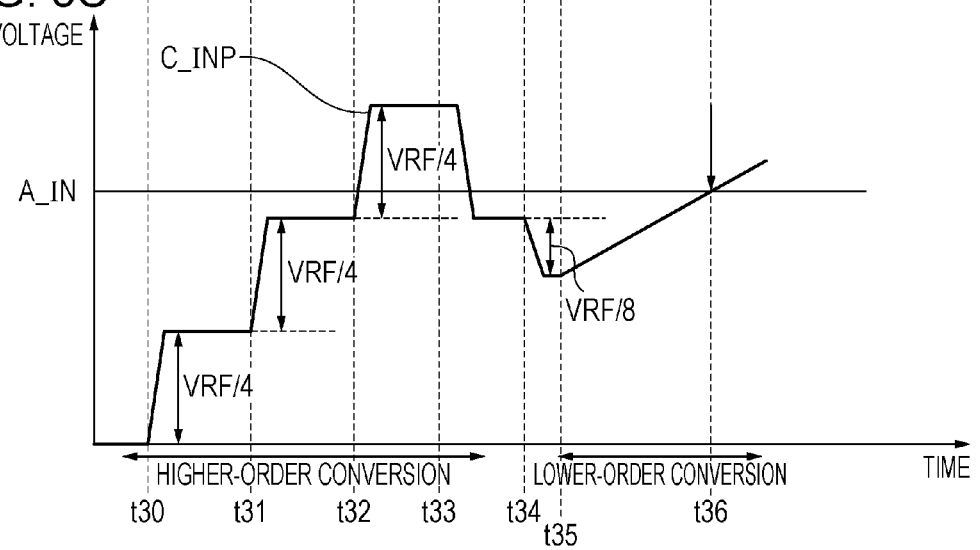
FIG. 5C is a diagram illustrating an exemplary operation of the AD conversion unit.

Operations of the comparison input unit 210 and the comparator 220 illustrated in FIG. 5A will be described with reference to FIGS. 5B and 5C.

At and before time t30, as in the first embodiment, the reset signal res is set to the H level so that charge in the capacitive elements C0, C1, C2, C3-1, C3-2, and C3-3 is reset. Then, the reset signal res is set to the L level, and the control signal φs_lo is set to the H level. After the reset signal res is set to the L level, the amplified pixel signal is supplied from the amplifier unit 105 via the capacitive element C0 to the comparator 220. The control signals φs5, φs6, and φs7 are set to the L level.

At time t30, the control circuit 230 sets the control signal φs7 to the H level. Thus, the potential of the signal C_INP increases by VRF/4 from the potential at and before time t30. Since the potential of the analog signal A_IN is higher than that of the signal C_INP, the comparator 220 outputs the comparison result signal CMP having a signal value of "1" to the control circuit 230.

The control circuit 230 receives the comparison result signal CMP having a signal value of "1", and sets the control signal φs6 to the H level at time t31. Thus, the potential of the signal C_INP increases by VRF/4 from the potential obtained at time t30. At this time point, since the potential of the analog signal A_IN remains higher than that of the signal C_INP, the comparator 220 outputs the comparison result signal CMP having a signal value of "1" to the control circuit 230.

The control circuit 230 receives the comparison result signal CMP having a signal value of "1", and sets the control signal φs5 to the H level at time t32. Thus, the potential of the signal C_INP increases by VRF/4 from the potential obtained at time t31. Since the potential of the signal C_INP is higher than that of the analog signal A_IN, the comparator 220 outputs the comparison result signal CMP having a signal value of "0" to the control circuit 230.

The control circuit 230 receives the comparison result signal CMP having a signal value of "0", and sets the control signal φs5 to the L level at time t33. Thus, the potential of the signal C_INP becomes the potential at time t31.

The control circuit 230 sets the control signal φs_lo to the L level at time t34. Thus, the potential of the signal C_INP decreases by VRF/8 from the potential obtained at time t33.

At time t35, the ramp signal supply circuit 320 starts changing the potential of the ramp signal VRMP depending on time. The operations of the ramp signal supply circuit 320, the comparator 220, and the counter 240 after time t35 may be similar to those in the first embodiment. Similarly to the first embodiment, the count signal has 8 bits. Therefore, in the second embodiment, AD conversion into 11 bits in total, i.e., the higher-order 3 bits and the lower-order 8 bits, can be performed. If AD conversion into 13 bits in total using the higher-order 5 bits is performed as in the first embodiment, more capacitive elements having a capacitance of 1C may be provided for the inverting input node of the comparator 220 in parallel.

In the configuration of the comparison input unit 210 and the comparator 220 according to the second embodiment, correction of at least one of the digital signals Dlo and Dhi and correction of the reference potential VRF can be desirably achieved by performing the correction operation described in the first embodiment. That is, in the second embodiment, a correction value α may be obtained, and the reference potential VRF and at least one of the digital signals Dhi and Dlo may be corrected on the basis of the operation described in FIGS. 3 and 4A to 4E.

Third Embodiment

In the first and second embodiments, the AD conversion unit 260 is operated as a successive approximation AD conversion unit, and the signal values of the higher-order bits of a digital signal are determined. In contrast, the AD conversion unit 260 is operated as a ramp AD conversion unit, and the signal values of the lower-order bits of the digital signal are determined. In a third embodiment, the signal values of the higher-order bits of a digital signal are determined by operating the AD conversion unit 260 as a ramp AD conversion unit. In contrast, the signal values of the lower-order bits of a digital signal are determined by operating the AD conversion unit 260 as a successive approximation AD conversion unit.

An exemplary circuit configuration of the AD conversion unit 260 will be described with reference to FIG. 6A. The AD conversion unit 260 will be described below by focusing on points different from those in the first embodiment. The AD conversion unit 260 narrows a range including the value of the analog signal A_IN through ramp comparison, and then determines the value of a digital signal Sout through successive approximation.

The comparison input unit 210 further includes a capacitive element cph and a switch swh in addition to the components illustrated in FIG. 2A. The switch swh is connected between a capacitive element cp5 and the ramp signal VRMP. One electrode of the capacitive element cph is connected between the switch swh and the capacitive element cp5, and the other electrode is supplied with the ground potential GND. The capacitance of the capacitive element cph is 64C. Each of the capacitive elements cp0 to cp5 has the capacitance mentioned in FIG. 6A. That is, the capacitance of the capacitive element cph is four times the maximum capacitance in capacitive elements cp0 to cp4 having binary-weighted capacitances. Each of the capacitive elements cp0 to cp4 connects a corresponding one of switches sw0 to sw4 mentioned in FIG. 6A.

An exemplary AD conversion operation performed by the AD conversion unit 260 will be described with reference to the timing chart in FIG. 6B and FIG. 6C. Until a ramp comparison period starts, the value of the ramp signal VRMP is equal to the ground potential GND. In the ramp comparison period, the voltage changes from a voltage V0 to the ground potential GND depending on time. In the example in FIG. 6B, the ramp signal VRMP linearly decreases. The value of the ramp signal VRMP decreases by $V0/2^4$ per clock. This enables the AD conversion unit 260 to compare the analog signal A_IN with the signal C_INP with 4-bit resolution in a ramp comparison period. As a result, the range including the value of the analog signal A_IN is narrowed to a range having a width of $V0/2^4$. In FIG. 6B, φswh indicates the value of a control signal supplied from the control circuit 230 to the switch swh. When the supplied control signal is at the H level, the switch swh is brought into conduction. When the control signal is at the L level, the switch swh is brought out of conduction.

An AD conversion operation performed by the AD conversion unit 260 will be described. In a preparation period, the control circuit 230 sets control signals supplied to the switches sw0 to sw4 to the L level, and sets control signal supplied to switch swh and the reset signal res to the H level. Thus, the non-inverting input node and the inverting input node of the comparator 220 are reset to the ground potential GND, and the value of the signal C_INP is equal to the ground potential GND. After that, the control circuit 230 sets the control signals supplied to the switches sw5 and sw6 to the L level. In the subsequent operation, the non-inverting input node of the comparator 220 continues to be supplied with the analog signal A_IN. At the time of starting the ramp comparison period, the control circuit 230 keeps the control signal supplied to the switch swh at the H level.

When the ramp comparison period starts, the potential of the ramp signal VRMP increases up to V0, and then start decreasing. At the time of starting decreasing the ramp signal VRMP, the control circuit 230 causes the counter 240 to start counting. While the ramp signal VRMP changes from the potential V0 to the ground potential GND, the value of the signal C_INP also decreases from a reference voltage Vref by Vref/16 (i.e., a range indicated by an arrow 701) per clock (per unit time). At the time point when the signal value of the comparison result signal CMP supplied from the comparator 220 is changed, the control circuit 230 switches the control signal supplied to the switch swh to the L level. This enables the value of the signal C_INP at that time point to be sampled in the capacitive element cph. The count value obtained by the counter 240 corresponds to the digital signal Dhi for the higher-order bits. The control circuit 230 can narrow the range including the value of the analog signal A_IN to a range indicated by an arrow 702. In a subsequent successive approximation, the control circuit 230 performs binary search by using the capacitive elements cp0 to cp4, and determines the signal value of the digital signal Dlo for the lower-order bits.

Figure 7A:
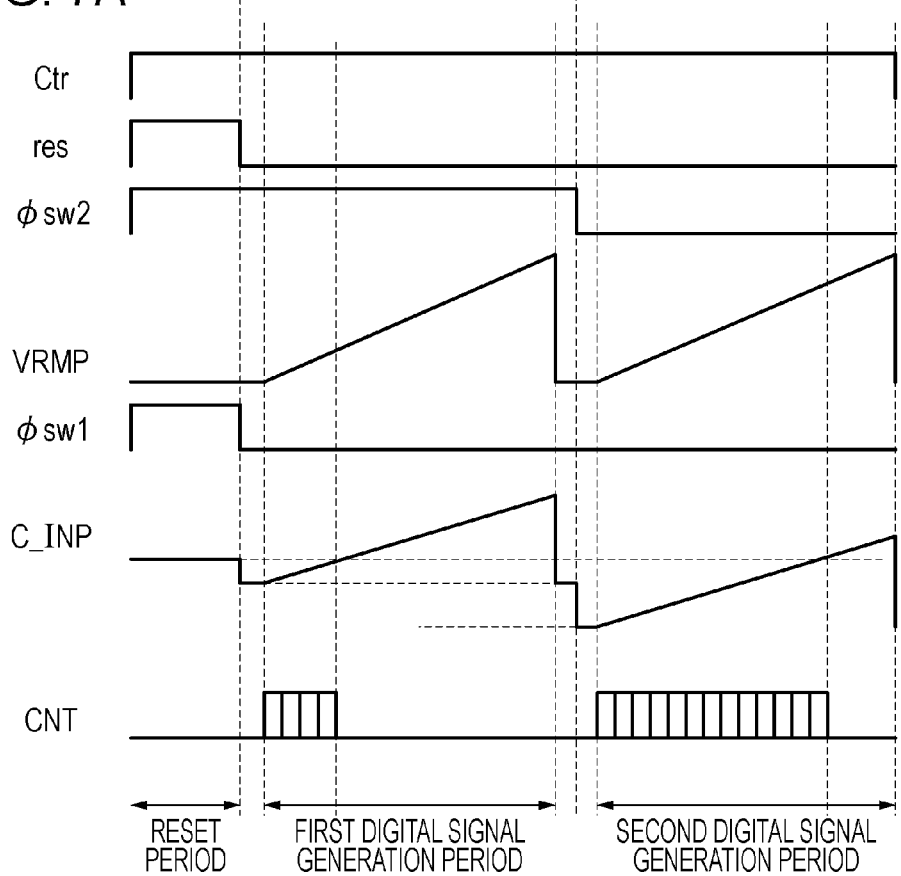
FIG. 7A is a diagram illustrating another exemplary operation of the AD conversion unit.

As illustrated in FIG. 7A, a first digital signal generation period in which a first digital signal is generated and a second digital signal generation period in which a second digital signal is generated are also provided for the AD conversion unit 260 according to the third embodiment. A correction value α can be obtained on the basis of the difference between the generated first digital signal and the generated second digital signal. This allows the first correction operation and the second correction operation to be performed.

In the third embodiment, an effect similar to that in the first embodiment can be obtained.

Fourth Embodiment

Figure 7B:
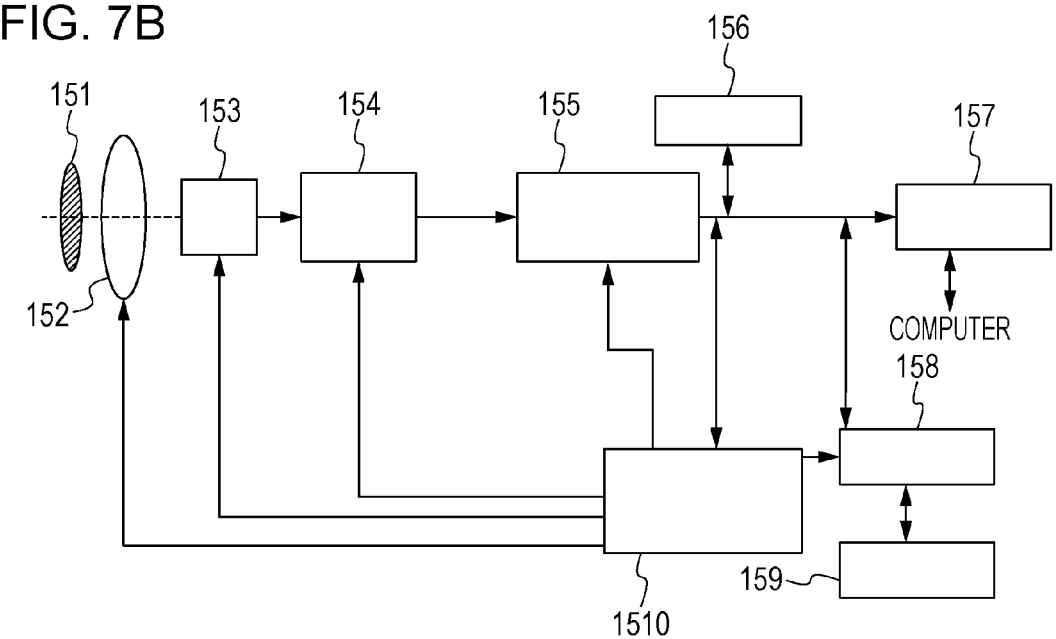
FIG. 7B is a diagram illustrating an exemplary configuration of an image pickup system.

FIG. 7B illustrates an image pickup system including the image pickup apparatus according to the first, second, or third embodiment.

In FIG. 7B, the image pickup system includes a barrier 151 for protecting a lens, a lens 152 which causes an optical image of a subject to be formed on the image pickup apparatus 154, and an aperture 153 for changing the amount of light which has passed through the lens 152. The image pickup system further includes an output signal processor 155 which processes a signal which is output from the image pickup apparatus 154. A signal which is output from the image pickup apparatus 154 is an image pickup signal for generating an image of a photographed subject. The output signal processor 155 generates an image by subjecting the image pickup signal which is output from the image pickup apparatus 154 to various corrections and compression when necessary. The lens 152 and the aperture 153 constitute an optical system for focusing light on the image pickup apparatus 154.

The image pickup system illustrated in FIG. 7B further includes a buffer memory 156 for temporarily storing image data, and an external interface 157 for communicating with an external computer or the like. The image pickup system further includes a detachable recording medium 159, such as a semiconductor memory, for recording and reading out image pickup data, and a recording medium control interface 158 for recording/reading out data in/from the recording medium 159. The image pickup system further includes an overall-control/calculation unit 1510 which performs various types of calculation and which controls the entire digital still camera.

The image pickup apparatus 154 included in the image pickup system illustrated in FIG. 7B may have a configuration described in the first, second, or third embodiment. Thus, in the image pickup apparatus 154 included in the image pickup system illustrated in FIG. 7B, the effect described in the first, second, and third embodiments can be achieved.

The output signal processor 155 may have the signal processing circuit 410 described in the first, second, and third embodiments. This configuration also achieves the effect described in the first, second, and third embodiments.

One disclosed aspect of the embodiments enables desirable correction of the reference potential used in the operation of a successive approximation AD conversion circuit and desirable correction of a digital signal generated through AD conversion. Thus, linearity in an AD conversion unit which operates as a successive approximation AD conversion circuit and a ramp AD conversion circuit can be improved.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-273637 filed Dec. 14, 2012, which is hereby incorporated by reference herein in its entirety.

What is claimed is:

1. A method for driving an image pickup apparatus including
   a pixel configured to output a pixel signal, and
   an AD conversion unit configured to convert the pixel signal into a digital signal, the AD conversion unit including a comparator configured to compare a reference signal with a signal based on the pixel signal and output a comparison result signal,
the method comprising:
   determining signal values of higher-order bits of the digital signal based on the pixel signal by operating the AD conversion unit as one of a successive approximation AD conversion circuit and a ramp AD conversion circuit; and
   after the signal values of the higher-order bits are determined, determining signal values of lower-order bits of the digital signal based on the pixel signal by operating the AD conversion unit as the other one of the successive approximation AD conversion circuit and the ramp AD conversion circuit,
   wherein, when the AD conversion unit is operated as the ramp AD conversion circuit,
      the AD conversion unit generates a first digital signal on the basis of the comparison result signal which is output by the comparator supplied with a first ramp signal as the reference signal and a comparison signal and comparing the first ramp signal with the comparison signal,
      the AD conversion unit generates a second digital signal on the basis of the comparison result signal which is output by the comparator supplied with a second ramp signal as the reference signal and the comparison signal and comparing the second ramp signal with the comparison signal, the second ramp signal having a ramp start potential different from a ramp start potential of the first ramp signal,
      the image pickup apparatus generates a correction value on the basis of the first digital signal and the second digital signal,
      a first correction operation of correcting a reference potential on the basis of the correction value is performed, the reference potential being used when the AD conversion unit is operated as the successive approximation AD conversion circuit, and
      a second correction operation of correcting the digital signal based on the pixel signal on the basis of the correction value is performed.

2. The method for driving an image pickup apparatus, according to claim 1,
   the image pickup apparatus further including
   a plurality of AD conversion units including the AD conversion unit, and a plurality of pixels including the pixel,
   wherein the plurality of pixels form a plurality of pixel columns, each of the plurality of AD conversion units being provided for a corresponding one of the plurality of pixel columns, and
   wherein an average is obtained from correction values, each of the correction values being the correction value generated by a corresponding one of the plurality of AD conversion units, and the first correction operation and the second correction operation are performed on the basis of the average.

3. The method for driving an image pickup apparatus, according to claim 1,
   wherein the comparison signal is a signal based on the reference potential,
   wherein a third digital signal is generated on the basis of a second comparison signal based on the corrected reference potential and the first ramp signal, wherein a fourth digital signal is generated on the basis of the second comparison signal and the second ramp signal, wherein a second correction value is generated on the basis of the third digital signal and the fourth digital signal, and wherein the correction value used in the second correction operation is the second correction value.

4. The method for driving an image pickup apparatus, according to claim 1, wherein the second correction operation is performed in a range from the minimum value to the maximum value of the digital signal generated by the AD conversion unit, by using the single correction value.

5. The method for driving an image pickup apparatus, according to claim 1, wherein the AD conversion unit is operated as the successive approximation AD conversion circuit, and determines signal values of the higher-order bits of the digital signal based on the pixel signal, the higher-order bits having a plurality of bits, wherein the AD conversion unit is operated as the ramp AD conversion circuit, and determines signal values of the lower-order bits of the digital signal based on the pixel signal, and wherein a potential difference between the ramp start potential of the first ramp signal and the ramp start potential of the second ramp signal is a potential difference corresponding to a range of the signal value of the least significant bit among the higher-order bits.

6. The method for driving an image pickup apparatus, according to claim 1, wherein, in an operation performed when the AD conversion unit is operated as the ramp AD conversion circuit, a ramp signal supplied to the comparator is not corrected.

7. The method for driving an image pickup apparatus, according to claim 1, wherein the comparator includes first and second nodes, wherein the comparator compares a potential at the first node with a potential at the second node, and wherein the image pickup apparatus supplies the first node of the comparator with the pixel signal or a test signal, and supplies the second node of the comparator with the first ramp signal and the second ramp signal in sequence.

8. The method for driving an image pickup apparatus, according to claim 7, wherein a signal value of the test signal is based on a signal value of a noise signal which is output by the pixel.

9. The method for driving an image pickup apparatus, according to claim 7, wherein the image pickup apparatus further includes an optical black pixel, and wherein a signal value of the test signal is based on a signal value of a signal which is output by the optical black pixel.

10. The method for driving an image pickup apparatus, according to claim 7, wherein the image pickup apparatus further includes a reference pixel, and wherein a signal value of the test signal is based on a signal value of a signal which is output by the reference pixel.

11. The method for driving an image pickup apparatus, according to claim 7, wherein the image pickup apparatus further includes an amplifier unit having an input node supplied with the pixel signal, and the amplifier unit outputs a signal to the comparator by multiplying the pixel signal by a gain, and wherein a signal value of the test signal is based on a signal value of a signal which is output by the amplifier unit on the basis of a potential at the input node which is reset.

12. The method for driving an image pickup apparatus, according to claim 1, wherein the AD conversion unit further includes a signal supply circuit having a plurality of capacitances, wherein the signal supply circuit supplies the first ramp signal to the comparator on the basis of the reference potential and a first capacitance among the plurality of capacitances, and wherein the signal supply circuit supplies the second ramp signal to the comparator on the basis of the reference potential and a second capacitance whose capacitance value is different from the capacitance value of the first capacitance.

13. The method for driving an image pickup apparatus, according to claim 1, wherein the correction value is generated on the basis of a difference between the first digital signal and the second digital signal.

14. An image pickup apparatus comprising:

a pixel configured to output a pixel signal;

an AD conversion unit configured to convert the pixel signal into a digital signal, the AD conversion unit including a comparator configured to compare a reference signal with a signal based on the pixel signal and output a comparison result signal; and a control circuit, wherein the control circuit determines signal values of higher-order bits of the digital signal based on the pixel signal by operating the AD conversion unit as one of a successive approximation AD conversion circuit and a ramp AD conversion circuit, and then determines signal values of lower-order bits of the digital signal based on the pixel signal by operating the AD conversion unit as the other one of the successive approximation AD conversion circuit and the ramp AD conversion circuit, wherein, when the control circuit causes the AD conversion unit to operate as the ramp AD conversion circuit, the AD conversion unit generates a first digital signal on the basis of the comparison result signal which is output by the comparator supplied with a first ramp signal as the reference signal and a comparison signal and comparing the first ramp signal with the comparison signal, and the AD conversion unit generates a second digital signal on the basis of the comparison result signal which is output by the comparator supplied with a second ramp signal as the reference signal and the comparison signal and comparing the second ramp signal with the comparison signal, the second ramp signal having a ramp start potential different from a ramp start potential of the first ramp signal, wherein the image pickup apparatus further includes a signal processing circuit supplied with the first digital signal and the second digital signal, and wherein the signal processing circuit includes a circuit configured to generate a correction value on the basis of the first digital signal and the second digital signal, and a circuit configured to perform a first correction operation of correcting a reference potential used when the AD conversion unit is operated as the successive approximation AD conversion circuit, on the basis of the correction value, and a second correction operation of correcting the digital signal, into which the pixel signal is converted, on the basis of the correction value.

15. An image pickup system comprising:
the image pickup apparatus according to claim 14; and
an output signal processor configured to process a signal which is output from the image pickup apparatus.

16. An image pickup system comprising:
an image pickup apparatus including
a pixel configured to output a pixel signal,
an AD conversion unit configured to convert the pixel signal into a digital signal, the AD conversion unit including a comparator configured to compare a reference signal with a signal based on the pixel signal and output a comparison result signal, and
a control circuit; and
an output signal processor,
wherein the control circuit
determines signal values of higher-order bits of the digital signal based on the pixel signal by operating the AD conversion unit as one of a successive approximation AD conversion circuit and a ramp AD conversion circuit, and
then determines signal values of lower-order bits of the digital signal based on the pixel signal by operating the AD conversion unit as the other one of the successive approximation AD conversion circuit and the ramp AD conversion circuit,
wherein, when the control circuit causes the AD conversion unit to operate as the ramp AD conversion circuit,
the AD conversion unit generates a first digital signal on the basis of the comparison result signal which is output by the comparator supplied with a first ramp signal as the reference signal and a comparison signal and comparing the first ramp signal with the comparison signal, and
the AD conversion unit generates a second digital signal on the basis of the comparison result signal which is output by the comparator supplied with a second ramp signal as the reference signal and the comparison signal and comparing the second ramp signal with the comparison signal, the second ramp signal having a ramp start potential different from a ramp start potential of the first ramp signal,
wherein the output signal processor is supplied with the first digital signal and the second digital signal, and
wherein the output signal processor includes
a circuit configured to generate a correction value on the basis of the first digital signal and the second digital signal, and
a circuit configured to perform a first correction operation of correcting a reference potential used when the AD conversion unit is operated as the successive approximation AD conversion circuit, on the basis of the correction value, and a second correction operation of correcting the digital signal, into which the pixel signal is converted, on the basis of the correction value.

\* \* \* \* \*